US009947221B1

(12) United States Patent
Mazzola (10) Patent No.: US 9,947,221 B1
(45) Date of Patent: Apr. 17, 2018

(54) SYSTEMS AND METHODS OF VEHICULAR COMMUNICATION (71) Applicant: Robert Mazzola, Palo Alto, CA (US)

(72) Inventor: Robert Mazzola, Palo Alto, CA (US)

(*) Notice: Subject to any disclaimer, the term of this patent is extended or adjusted under 35 U.S.C. 154(b) by 0 days.

(21) Appl. No.: 15/430,533

(22) Filed: Feb. 12, 2017

(51) Int. Cl.
G08G 1/16 (2006.01)
G08G 1/0967 (2006.01)
G07C 5/00 (2006.01)
B60Q 9/00 (2006.01)
B60K 35/00 (2006.01)

(52) U.S. Cl.
CPC ....... G08G 1/096783 (2013.01); B60K 35/00 (2013.01); B60Q 9/00 (2013.01); G07C 5/008 (2013.01); G08G 1/096791 (2013.01); B60K 2350/106 (2013.01); B60K 2350/2065 (2013.01)

(58) Field of Classification Search
CPC ....... G08G 1/096783; G08G 1/096791; B60K 35/00; B60K 2350/106; B60K 2350/2065; B60Q 9/00; G07C 5/005
USPC ............. 340/902, 903, 995.13; 701/113, 117
See application file for complete search history.

(56) References Cited

U.S. PATENT DOCUMENTS

| 6,765,495 | B1* | 7/2004 | Dunning | G08G 1/161 340/435 |
| 7,327,280 | B2* | 2/2008 | Bachelder | F41G 9/00 340/902 |
| 8,195,394 | B1 | 6/2012 | Zhu | |
| 8,280,623 | B2 | 10/2012 | Trepagnier | |
| 9,147,353 | B1 | 9/2015 | Slusar | |
| 9,330,571 | B2 | 5/2016 | Ferguson et al. | |
| 9,367,095 | B2 | 6/2016 | Myers | |
| 2006/0031003 | A1* | 2/2006 | Sun | G08G 1/0965 701/117 |
| 2009/0082950 | A1* | 3/2009 | Vorona | G08G 1/0104 701/119 |
| 2010/0056161 | A1* | 3/2010 | Matsumura | H04B 7/2606 455/445 |
| 2011/0160985 | A1* | 6/2011 | Yamaguchi | B60W 50/0205 701/112 |
| 2016/0086305 | A1 | 3/2016 | Watanabe | |
| 2017/0337816 | A1* | 11/2017 | Lu | G08G 1/0962 |

* cited by examiner

Primary Examiner — Ojiako Nwugo (57) ABSTRACT

Vehicular communication systems and methods are disclosed, including one or more media devices. A host device inside a vehicle is coupled to a media device that is adaptable to being mounted to the vehicle. The media device includes a display configured to display a default image. The host device is configured to receive data associated with a predefined direction of the vehicle from vehicle operation sensors on the vehicle and receive traffic data from one or more application servers. In response to the data, the host device determines a vehicle status and transmits media content to be presented on the display, including at least one road sign. The host device is further configured to establish a link with a second media device including a display and transmit instructions to project the media content.

19 Claims, 9 Drawing Sheets

SYSTEMS AND METHODS OF VEHICULAR COMMUNICATION

The present disclosure relates generally to vehicle communication, and more particularly to systems and methods for displaying media on media devices.

Most vehicles are equipped with primitive, anachronistic communication devices. Anyone ever attempting to parallel park in a busy metropolitan area realizes that hand signals, brake lights, and turning signals are inadequate to communicate with other drivers about their intentions. A device is needed that can complement or even replace traditional inter-vehicular communication devices.

Bumper stickers are another communication medium that have not advanced in the 21st century. But "[f] or those citizens without wealth or power, a bumper sticker may be one of the few means available to convey a message to a public audience." *Baker v. Glover*, 776 F.Supp. 1511 (M.D. Ala. 1991). Bumper stickers are a common way to spread a message, be it political, literary, social, satirical—or simply for shock value. The drawbacks of bumper stickers are the limited expression of a single message and the possibility of damage and diminished value to the car.

There has been a long felt need for a mountable media device to replace or supplement conventional vehicle communication media. Accordingly, it would be desirable to provide improved methods and systems of vehicular communication.

SUMMARY

According to one embodiment, an apparatus includes a host device inside a vehicle coupled to a media device. The media device is adaptable to being mounted to the vehicle and includes a display within a housing. The host device is configured to receive data associated with a predefined direction of the vehicle from one or more vehicle operation sensors coupled to the vehicle, receive traffic data from one or more application servers over a network, identify a first traffic object in the predefined direction of the vehicle, determine a vehicle status based on the data about the predefined direction of the vehicle and the traffic data, and transmit media content to be presented on the display to a second traffic object different from the vehicle associated with the determined vehicle status, the media content including a first image comprising at least one road sign. According to yet another embodiment, the host device is coupled to the media device via a wireless link. According to yet another embodiment, the host device includes a second display, and the host device is further configured to present second media on the display corresponding to the determined vehicle status, including a second image comprising the at least one road sign. According to yet another embodiment, the host device is further configured to project an audible warning corresponding to the at least one road sign through speakers of the vehicle. According to yet another embodiment, the vehicle status corresponds to a parking mode, and the first image comprises at least one parking road sign. According to yet another embodiment, the media device is mounted on a rear portion of the vehicle. According to yet another embodiment, the host device is further configured to establish a communication link with a second host device inside a second vehicle. According to yet another embodiment, the host device is further configured to transmit instructions to project the media content on a second host device. According to yet another embodiment, the host device is further configured to transmit instructions to project the media content on a second media device mounted on a second vehicle.

According to yet another embodiment, a method includes receiving, by a host device inside a vehicle coupled to a media device, data associated with a predefined direction of the vehicle from one or more vehicle operation sensors coupled to the vehicle. The method further includes receiving traffic data from one or more application servers over a network, identifying a first traffic object in the predefined direction of the vehicle, determining a vehicle status based on the data about the predefined direction of the vehicle and the traffic data, and transmitting media content to be presented on the display to a second traffic object different from the vehicle associated with the determined vehicle status, the media content including a first image comprising at least one road sign. According to yet another embodiment, the method further comprises projecting an audible warning corresponding to the at least one road sign through speakers of the vehicle. According to yet another embodiment, the media device is mounted to the outside of the vehicle. According to yet another embodiment, the mounted media device is mounted to a rear outer portion of the vehicle by one or more fasteners. According to yet another embodiment, the method further comprises transmitting instructions to project the media content on a second host device. According to yet another embodiment, the method further comprises projecting the media on an augmented reality windshield within the vehicle.

According to yet another embodiment, a system includes a host device inside a motorized vehicle and a media device mounted to the vehicle and including a display within a housing. The media device is configured to receive data associated with a predefined direction of the vehicle from one or more vehicle operation sensors coupled to the vehicle, receive traffic data from one or more application servers over a network, identify a first traffic object in the predefined direction of the vehicle, determine a vehicle status based on the data about the predefined direction of the vehicle and the traffic data, and transmit media content to be presented on the display to a second traffic object different from the vehicle associated with the determined vehicle status, the media content including a first image comprising at least one road sign. According to yet another embodiment, the host device includes a second display and is configured to display the media on the second display. According to yet another embodiment, the display is configured to display a default image different from the first image. According to yet another embodiment, the media device has a flexible, 3-D shape.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, a media device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a media device may be a personal computer, a portable digital assistant (PDA), a consumer electronic device, a display device or monitor, a smartphone, or any other suitable device and may vary in size, shape, performance, functionality, and price. The media device may include memory, one or more processing resources such as a central processing unit (CPU) or hardware or software control logic. Additional components of the media device may include one or more storage devices, one or more communications ports for communicating with external devices as well as various input and output (I/O) devices, such as a keyboard, a mouse, touchscreen, button inputs, microphone, motion sensor, and/or a video display.

In one example, imagine you are driving behind a truck or some other large vehicle that blocks your view of the road ahead. With your view ahead obscured, road hazards may come up unexpectedly as you follow behind the truck. If the truck were equipped with some media device that could project road signs, it could give you advanced warning of upcoming road hazards. Your vehicle console could be in communication with such a media device, and project audible warnings on your console speakers in addition to visual warnings on a console display. If your vehicle were also equipped with similar devices, a media device on your bumper, for example, could give advanced warning to a driver following behind you. Of course, this scenario is just one non-limiting example in which disclosed embodiments present an advantage of increased communication between vehicles. Other scenarios and combinations of devices are contemplated for disclosed embodiments.

Figure 1:
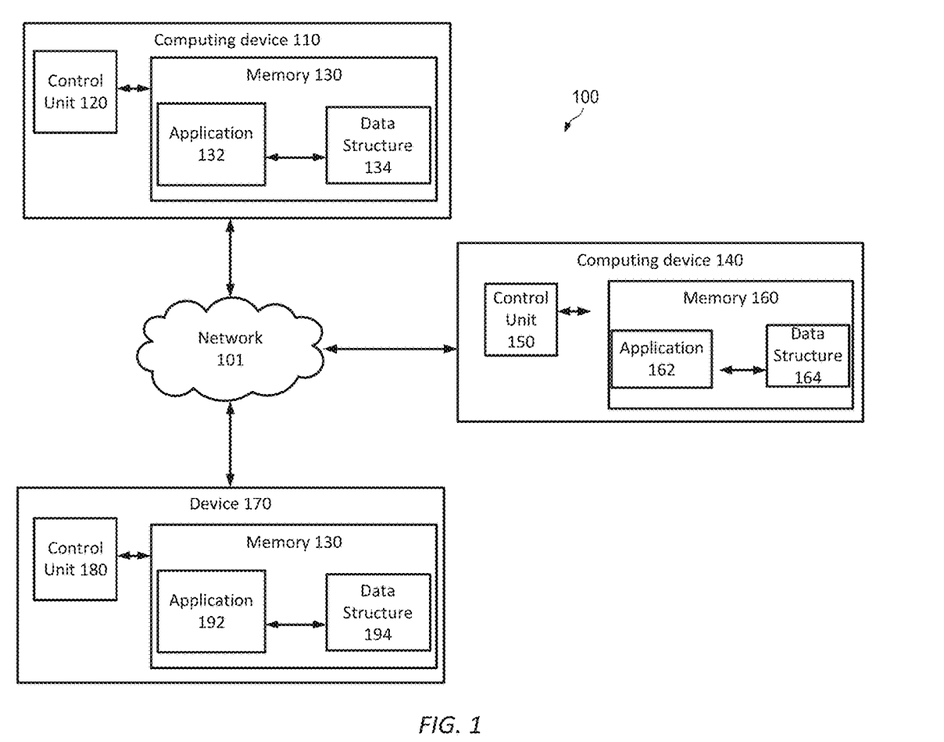
FIG. 1 is an exemplary diagram of a distributed computing system according to some embodiments.

FIG. 1 is a simplified diagram of a distributed computing system 100 according to some embodiments. As shown in FIG. 1, system 100 includes three computing devices 110, 140, and 170. Although only three computing devices 110, 140, and 170 are shown in FIG. 1, one of ordinary skill would understand that distributed computing system 100 may include any number of computing devices of various types and/or capabilities. In some embodiments, computing devices 110, 140, and/or 170 may be any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned.

In some embodiments, computing device 110 includes a control unit 120 coupled to memory 130, computing device 140 includes a control unit 150 coupled to memory 160, and computing device 170 includes a control unit 190 coupled to memory 160. Each of control units 120, 150, and/or 180 may control the operation of its respective computing device 110, 140, and/or 170. In some examples, control units 120, 150, and/or 180 may each include one or more processors, central processing units (CPUs), graphical processing units (GPUs), virtual machines, microprocessors, microcontrollers, logic circuits, hardware finite state machines (FSMs), digital signal processors (DSPs) application specific integrated circuits (ASICs), field programmable gate arrays (FPGAs), and/or the like and/or combinations thereof.

Memory 130 may be used to store one or more applications and one or more data structures, such as a representative application 132 and data structure 134. Similarly, memory 160 may be used to store one or more applications and one or more data structures, such as a representative application 162 and data structure 164, and memory 190 may be used to store one or more applications and one or more data structures, such as a representative application 192 and data structure 194.

In some embodiments, memories 130, 160, and/or 190 may each include one or more types of machine readable media, including volatile and non-volatile memory. Some common forms of machine readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retains its data only while device is powered.

The data structures 134, 164, and/or 194 may vary in size, usage, and/or complexity depending upon the purposes of computing devices 110, 140, and/or 170 and/or applications 132, 162, and/or 192. In some embodiments, when computing devices 110, 140, and/or 170 are network switching devices, such as switches, routers, hubs, bridges, and/or the like, the data structures 134, 164, and/or 194 may include one or more tables with forwarding and/or similar information. In some examples, these tables may include one or more virtual LAN tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110 and/or 140, these tables may include anywhere from a few dozen entries to thousands, or even tens of thousands or more entries. In some examples, data from data structures 134, 164, and/or 194 may be retrieved, stored, or modified by a respective control unit in accordance with instructions which may be executed directly, e.g., machine code, or indirectly, e.g., scripts, by the respective control unit. The systems and methods of the present disclosure are not limited to any particular data structure.

In some embodiments, computing devices 110, 140, and 170 may also be coupled together using a network 101. In some embodiments, one or more of computing devices 110, 140, and 170 may be connected via any type of wired or wireless connections, such as DSRC, Bluetooth, satellite, RFID, fire wire, network, USB, Wi-Fi, RFID, Bluetooth, Infrared (e.g. GSM infrared), and/or the like and/or using any suitable wireless communication standards and protocols, such as IEEE 802.11 and WiMAX. Network 101, including any intervening nodes, may be any kind of network including a local area network (LAN) such as an Ethernet, a wide area network (WAN) such as an internet, a virtual or non-virtual private network, and/or the like and/or combinations thereof.

In some embodiments, network 101 may include any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned. Computing devices 110, 140, and 170 through their applications, such as applications 132, 162, and/or 192, may use network 101 to exchange information and/or to provide services for each other. In some examples, computing device 140 may be used to provide backup and/or fail over services for computing device 110. In some examples, computing device 140 may be maintaining data structure 164 as a synchronized copy of data structure 134. In some examples, one or more of components of computing devices 110, 140, and 170, such as a control unit, may be located remotely.

In some embodiments, computing devices 110, 140, and/or 170 may include an electronic display (not shown), the display may be an active matrix emitting diode (AMOLED), light-emitting diode (LED), organic LED (OLED), electrophoretic, liquid crystal, e-paper, and/or the like and/or combinations thereof. The display may also include retro-reflectors, such as active retro-reflectors described in U.S. Pat. No. 6,765,495, which is incorporated by reference in its entirety.

In some embodiments, computing devices 110, 140, and/or 170 may include various input and output (I/O) devices, such as a keyboard, a mouse, touchscreen, button inputs, microphone, motion sensor, video display and/or the like.

Figure 2:
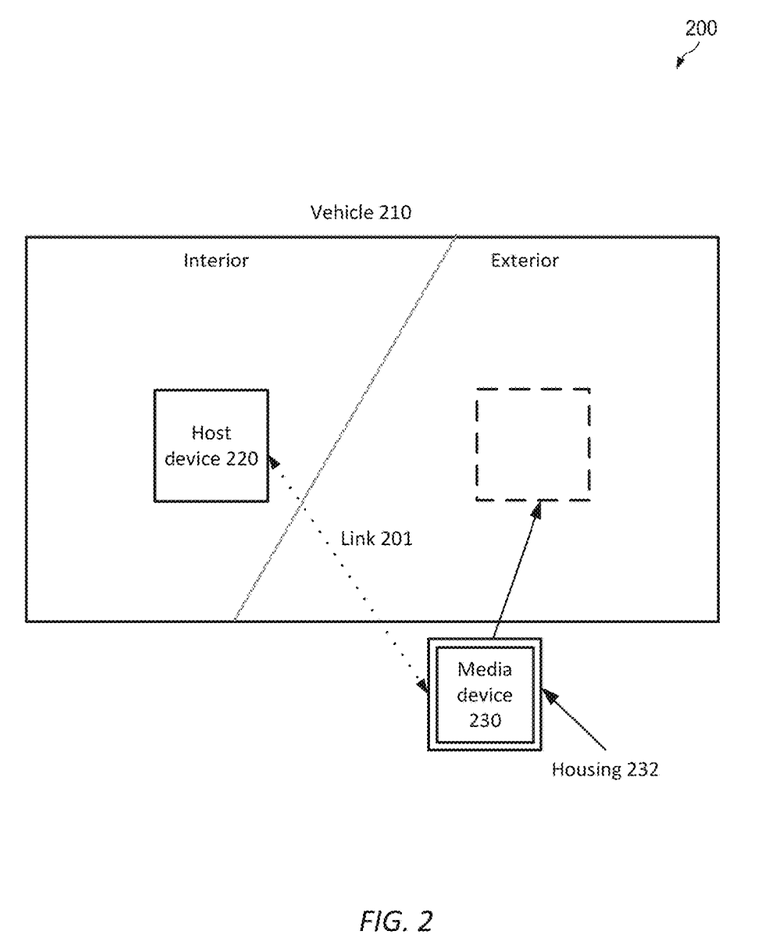
FIG. 2 is an exemplary diagram of vehicle system according to some embodiments.

FIG. 2 is a simplified diagram of a vehicle system 200. In some embodiments, as shown in FIG. 2, vehicle system 200 includes a vehicle 210, which may include a host device 220. A media device 230 may be mounted to the vehicle 210 within housing 232. In some examples, host device 220 and media device 230 correspond to computing device 110 and computing device 140, respectively, and may be in communication with one another using network 101.

In some embodiments, host device 220 may be a device within the vehicle, or may be part of the vehicle itself, such as an on-board vehicle computer. The vehicle may have more than one computing device. In some examples, host device 220 may be mounted inside vehicle 210, such as to a dashboard of the vehicle In some examples, vehicle 210 may be any type of vehicle, including, but not limited to, a car, truck, motorcycle, scooter, Segway, bus, golf cart, train, trolley, amusement vehicle, recreational vehicle, boat, watercraft, helicopter, airplane, and/or the like.

In some embodiments, media device may include a display within housing 232. In some embodiments, housing 232 may be multi-part, in which a portion is an optically transparent material, such as glass, and another portion may one or more other materials, such as metallic materials, e.g., aluminum, and/or plastic, which may provide a rigid support structure to prevent deformation of the display. In some examples, media device may include a flexible display arrangement such as described in U.S. Pat. No. 9,367,095, which is incorporated by reference in its entirety.

In some embodiments, media device 230 may be mounted on vehicle 210. In some examples, media device 230 is attached removably to an exterior of vehicle 210. In some examples, media device 230 is included within the vehicle 210, still visible from outside vehicle 210, for instance, by being attached to the trunk and being visible through the rear window of the vehicle, or by being attached to the dashboard and being visible through the front window of the vehicle. In some examples, media device 230 is a part of vehicle 210, such as part of the front bumper, rear bumper, side panels, taillight(s), headlights, parking lights, the trunk, the hood, windows, and/or the like and/or a combination thereof.

In some embodiments, media device 230 may be mounted to the exterior of vehicle 210 by magnets, adhesives, suction, fasteners, clamps, clips, and/or the like and/or combinations thereof. In some examples, media device may be mounted to the exterior of vehicle within a protective casing. In some examples, more than one media device like media device 230 is mounted on vehicle 210. In some examples, two media devices may be mounted to the exterior of vehicle 210 symmetrically, e.g., dividing the rear of the vehicle by a vertical axis in a center of the rear of vehicle 210, the two media devices being placed equidistant from the vertical axis. Such a dual arrangement is exemplified in FIG. 7.

In some embodiments, host device 220 may establish communication with media device 230, or vice versa. In some examples, media device 230 automatically establishes communication with host device 220 via link 201, such as by connections between one or more of computing devices 110, 140, and 170. In some examples, media device 230 is automatically in communication with host device 230 via wired connection. In some examples, media device 230 may contain its own power component, or may be powered by a power component within vehicle 210. In some examples, media device 230's power component may be charged while the vehicle is in operation, such as by a battery of vehicle 210. In some examples, media device 230 may be charged wirelessly, e.g., on a wireless charging surface. Vehicle 210 may contain a transmitter (not shown) for providing energy transmission and media device 230 may have a receiver for wireless power, whereby energy transfer occurs using magnetic resonant coupling. The transmitter may transmit power using multiple transmit coils and using parallel paths from such coils to multiple receive coils in the receiver.

In some embodiments, while host device 220 is in communication with media device 230, such as over network 101, host device 220 may exchange information and/or provide/receive services to/from media device 230. In some examples, host device 220 may prompt media device 230 to visually, audibly, or audiovisually playing media on media device 230.

In some embodiments, media that is played on media device 230 may be stored in a memory, such as memory 130, 160, and/or 190. In some examples, media played on media device 230 may be received from another device over network 101. Various exchanges contemplated are further described in the context of FIGS. 3-9.

Figure 3:
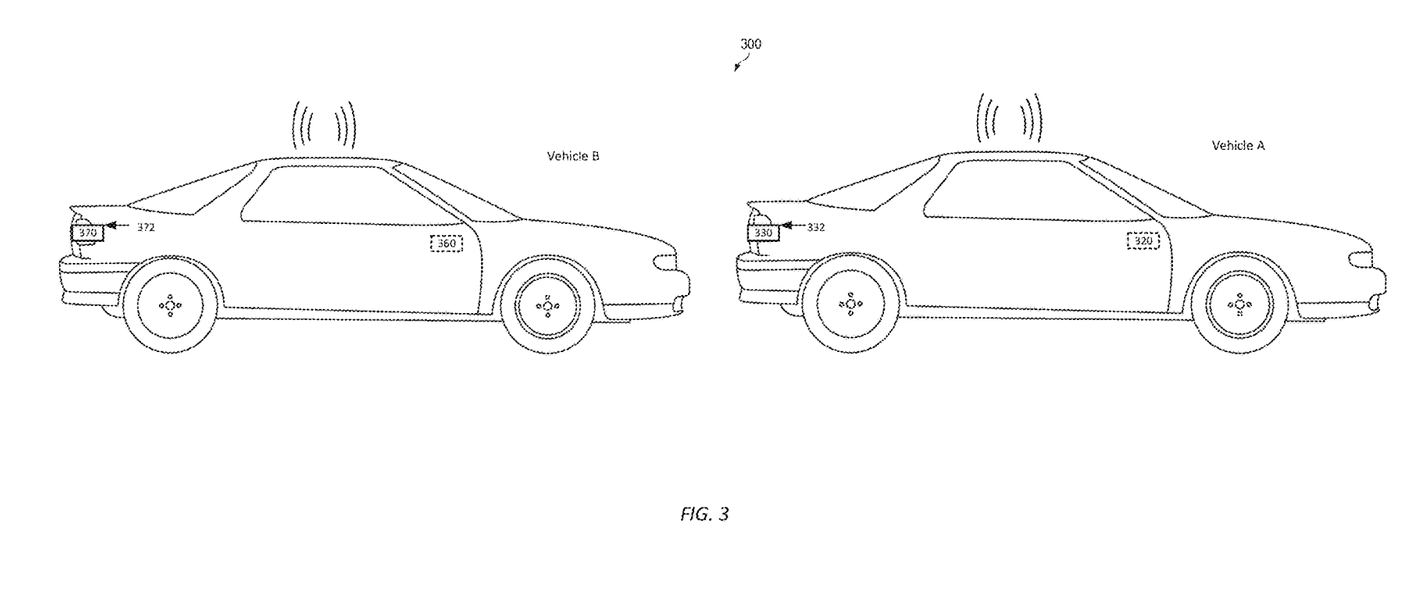
FIG. 3 is an exemplary diagram of a vehicle-to-vehicle system according to some embodiments.

FIG. 3 is an exemplary vehicle-to-vehicle (V2V) system. In some embodiments, the V2V systems may be configured to transmit vehicle operation data to each other and analyze driving data, such as V2V systems disclosed in U.S. Pat. No. 9,147,353 ('353 Patent), which is incorporated by reference in its entirety. In some examples, Vehicle A and/or Vehicle B correspond to vehicle 210. One or more of Vehicles A and B may be partially or totally autonomous, such as partially or totally autonomous vehicle systems and methods disclosed in U.S. Pat. No. 9,330,571, ('571 Patent) which is incorporated by reference in its entirety.

In some embodiments, Vehicle A may include host device 320 and media device 330 and Vehicle B may include host device 360 and media device 370. In some examples, one or more of host device 320, media device 330, host device 360 and/or media device 370 may correspond to computing device 110, computing device 140, and computing device 170, and may be in communication with one another using network 101. In some examples, host device 360 and/or media device 370 may correspond with computing device 170. In some examples, host device 320 and/or host device 360 may correspond with host device 220, while media device 330 and/or media device 370 may correspond with media device 230, and lastly, housing 332 and/or housing 372 may correspond with housing 232.

In some embodiments, media devices 320 and/or 370 are rectangular in shape, and may have rounded corners. In some examples media devices 320 and/or 370 may be oval, square, prismatic, trapezoidal, pyramidal, and/or the like and/or any other shape. In some examples, the media device is flexible and may form to the shape of the vehicle, and thus media device need not have a flat 2-D shape but may have a 3-D shape. A person of ordinary skill could contemplate other possible shapes and arrangements of media devices 320 and/or 370.

In some embodiments, Vehicle A and/or Vehicle B may contain vehicle operation sensors, such as sensors disclosed in U.S. Pat. No. 8,280,623, which is incorporated by reference in its entirety, and/or sensors disclosed in the '353 Patent. In some examples, host device 320, media device 330, host device 360, and/or media device 370 may be included as vehicle operation sensors and may be configured to communicate with the other vehicle operation sensors, which may include one or more external sensors. External sensors may include cameras, lasers, sonar, radar detection units (e.g., ones used for adaptive cruise control), and/or the like and/or combinations thereof, and may provide data updated in real-time, updating output to reflect current environment conditions. Object detection and classification for autonomous vehicles may be performed according to embodiments disclosed in U.S. Pat. No. 8,195,394, ('394 Patent) which is incorporated by reference in its entirety. In some examples, one or more objects may be detected in a first predefined direction of a vehicle. In some examples, the one or more sensors may detect external driving conditions, such as external temperature, rain, snow, light levels, and sun position for driver visibility; the location, speed, and bearing of the Vehicle A and/or Vehicle B; and/or object proximity data (e.g., pedestrian proximity data). The one or more sensors may detect internal conditions, such as the number of vehicle occupants, types of vehicle occupants, driver movement or fatigue, blood alcohol content of one or more vehicle occupants, and functionality of head lights, turn signals, hazard lights, radio, phone, and/or the like.

In some embodiments, sensors may transmit data to one or more of host device 320, media device 330, host device 360, and/or media device 370. In some examples, data may also be collected from other sources, including one or more application servers, and/or may be based on one or more vehicle operations, including acceleration, deacceleration, braking, turning, activation of hazard lights, and activation of turning signals, and/or other data collected from the one or more sensors. In some examples, application servers may be hosted by navigation applications such as GOOGLE MAPS, APPLE MAPS, WAZE, and/or the like and/or combinations thereof. In some examples, traffic data may be received from the one or more navigation application servers. In some examples, traffic data may include information about roads, including current congestion and congestion trends on one or more roads, accidents, emergencies, construction, road closings, detours, truck stops, rest stops, weather conditions, other road conditions, and/or the like.

In some embodiments, the host device 320, media device 330, host device 360, and/or media device 370 may be configured to determine a vehicle status based on the data. The vehicle status may be determined based on data from the vehicle operation sensors. A vehicle status may correspond with a present or future condition of the vehicle; a driving mode such as acceleration, braking, turning, slipping, drifting, skidding, driving in reverse, and/or the like; vehicle status may correspond to a typical road situation such as parking, stopping at a crosswalk with objects crossing, stopping at a railroad track, stopping at a stop light or stop sign, a road block, detours, construction, pulling over for emergency vehicles or other emergency situations; vehicle status may correspond to other driver's behavior, such as negative driving behaviors. In some examples, turning mode could be determined in response to a driver's movement, such as a head tilt, a hand signal, based on vehicular movement, such as drifting into another lane, based on data collected from vehicle operation sensors, and/or based on data from other sources, including one or more navigation applications. In some examples, negative driving behaviors may include tailgating, cutting-off, brake-checking, preventing another vehicle from merging, or racing, and positive driving behaviors such as proper signaling, yielding, defensive avoidance, or allowing another vehicle to merge, which may be determined by analyzing the vehicles speeds, relative positions, distances between, and other available sensor data, for example, according to techniques disclosed in the '353 Patent. Parking mode, for instance, may be determined based on an input to enter parking mode, a speed of the vehicle, a proximity to a set destination in a navigation application, from one or more applications used for locating parking, and/or the like and/or combinations thereof. Other road situations may be determined based on input indicating the particular road situations, based on data collected from vehicle operation sensors, and/or based on data from other sources, including one or more navigation applications.

In some embodiments, in response to receiving data and/or determining the vehicle status, one or more of host device 320, media device 330, host device 360, and/or media device 370 may retrieve media content that corresponds to the vehicle status. In some examples, media content may include one or more of a fixed image and/or video. In some examples, media device 330 and/or 370 may display media content in order to replace and/or complement traditional car signals. In some examples, the media content associated with a particular vehicle status comprises one or more signs associated with roads and/or vehicles. In some examples, signs may include one or more regulatory signs, warning signs, marker signs, guide and informational signs, recreational and cultural interest signs, signs for bicycles, temporary traffic control signs, railroad and light rail signs, school signs, emergency/incident management signs, animal signs, parking signs, turning signs, crossing signs, vehicle signs, and/or the like and/or combinations thereof. Signs may be standard sign shapes, may be present in a variety of sign colors in the visible light spectrum, and may include retroreflective aspects. In some examples, media device 330 and/or 370 may display a default fixed image and/or video, and then alternate to one or more signs as described above. In some examples, the media content comprises one or more audible noises, including rings, chimes, alarms, spoken phrases, and/or the like and/or combinations thereof. In some examples, media content may be stored on one or more of host device 320, media device 330, host device 360, and/or media device 370. In some examples, media content may be stored on a remote server (not shown), and the media content is retrieved from the remote server. In some examples, DSRC protocols and standards may be used, in which one or more of host device 320, media device 330, host device 360, and/or media device 370. may periodically broadcast data to each other and any vehicles or other receiving devices within its broadcast range.

In some embodiments, media device 330 may be mounted to Vehicle A. Media device 330 may receive media content and then project that media content, visually, audibly, or audiovisually. Media device 330 may transmit the media content to host device 360 and/or media device 370. In some examples, in response to receiving the transmission from media device 330, host devices 320 and/or 360, which are depicted as being within Vehicle A and Vehicle B, respectively, may visually, audibly, or audiovisually project the media, such as through car speakers and/or on a console display. In some embodiments, in response to receiving the transmission from media device 330, media device 370 may also project the media visually, audibly, or audiovisually. In some examples, media device 330, host device 320, host device 360, and/or media device 370 may project the same or similar media simultaneously, or nearly simultaneously, with a short delay of less than 5 seconds. Some of the advantages of disclosed embodiments over traditional driving systems includes the automatic detection of a lane change and automatic signaling. In some examples, automatic detection of slippage, or some other hazard, may prompt display of a warning on one or more of host device 320, media device 330, host device 360, and/or media device 370. Because not all vehicles and devices have adopted DSRC protocols and standards, manual, visual and/or audio recognition of driving conditions may be preferred. Some of the advantages of a media devices being perceivable externally include having a driver, pedestrian, or other able to appreciate a driving condition of a vehicle by visual and/or audio recognition.

In some embodiments, Vehicle A may be at a left turn light, and Vehicle B may be following Vehicle A. To complete a U-turn, oftentimes vehicles turn more slowly than when completing a left turn for increased traction. In some examples, Vehicle A may start driving slowly in an effort to complete a U-turn. Vehicle B may consequently follow too closely behind a Vehicle A, unaware of Vehicle A's intention to complete a U-turn. If Vehicle B had some indication that Vehicle A were attempting a U-turn rather than a left turn, Vehicle B could be able to compensate by backing off of Vehicle A and/or by going around Vehicle A. In some examples, Vehicle A, equipped with host device 320 and media device 330, determines a vehicle status corresponding to a U-turn. In response to determining that the vehicle status corresponds to a U-turn, media device 330 retrieves media content corresponding to an image and/or audio file and then projects that media content, visually, audibly, or audiovisually. The media device 330 provides an indication to others, including Vehicle B, that Vehicle A is attempting to complete a U-turn by visually displaying a U-turn sign and/or an audible warning, such as an alarm or spoken phrase (such as "U-turn," "stay back, completing U-turn," or a similar phrase).

In some embodiments, the vehicle status may be determined in response to vehicular movement or based on navigational data. In some examples, one or more of media device 330, host device 360, and/or media device 370 may receive navigational data from one or more navigation applications.

In some examples, Vehicle A and Vehicle B may be travelling on a two lane road in the same direction, with Vehicle A being in the leftmost lane and Vehicle B being in the rightmost lane. Vehicle A may stop for a pedestrian crossing the street. However, Vehicle B, behind Vehicle A, may not be able to see that Vehicle A is stopped to allow a pedestrian to cross because Vehicle A may be obscuring the view of the pedestrian. Vehicle B may not be inclined to stop because Vehicle B has no indication that there is a pedestrian crossing, thus possibly endangering the crossing pedestrian.

In some examples, Vehicle A, equipped with host device 320 and media device 330, determines that a vehicle status corresponding to a road stop. With sophisticated sensors, the sensors may even detect a pedestrian crossing the road or a crosswalk sign. In response to the vehicle status, media device 330 retrieves media content corresponding to an image and/or audio file and then projects that media content, visually, audibly, or audiovisually. The media device 330 provides an indication to others, including Vehicle B, that Vehicle A is stopped for a pedestrian, or is stopped at a crosswalk, or some other sign of caution to other vehicles. In some examples, an indication may be provided by visually displaying a first image of a crosswalk sign, a caution sign, a stop sign, and/or the like and/or some combination thereof, and/or an audible warning, such as an alarm or spoken phrase (such as "caution, pedestrian crossing," "pedestrian incoming," or a similar phrase). In some examples, at the same time, a second media device (not shown) located on another location of the vehicle, such as the front of Vehicle A (e.g., on the hood or front bumper), and could also broadcast a warning to the pedestrian, indicating that crossing is not safe. The second media device may provide an indication by visually displaying a second image, a crosswalk sign with a red X or a circle with a line through the radius of the circle, a caution sign, a stop sign, and/or the like and/or some combination thereof, and/or an audible warning, such as an alarm or spoken phrase (such as "caution, vehicle incoming," "not safe, wait for incoming vehicle," or a similar phrase). In such a manner, a plurality of media devices can project media content corresponding to a vehicle status and alert audiovisually to other drivers, vehicles, pedestrians, and/or other objects road signals for more effective communication and increased safety. A person of ordinary skill would appreciate that other road situations are contemplated for disclosed embodiments, and/ or any number of other Vehicles (not shown) could be present, optionally equipped with more host devices and/or media devices in communication with each other similar to one or more of host device 320, media device 330, host device 360, and/or media device 370.

Many states have various regulations on what colors of lights may be available for display on vehicles. In conformity with those laws, media device may be configured to not display colors in violation of those laws, such as by changing the hue of the light in order to differentiate the color.

Figure 4:
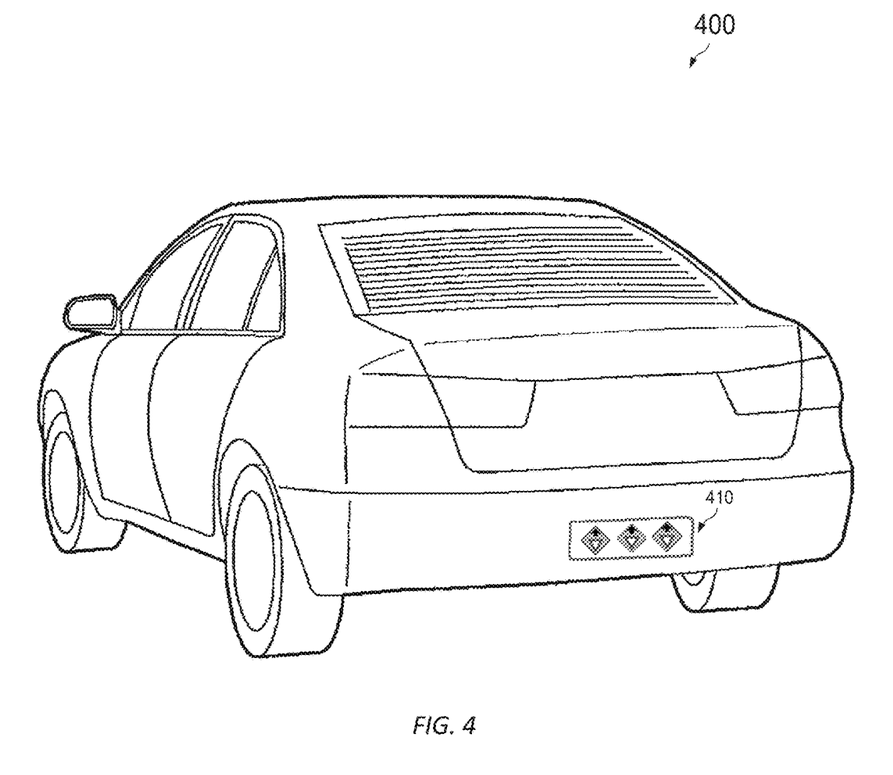
FIG. 4 is an exemplary diagram of a vehicle with a mountable media device according to some embodiments.

FIG. 4 is a simplified diagram of a vehicle 400 including media device 410 mounted thereto. In some examples, vehicle 400 corresponds with any of vehicle 200, Vehicle A, and/or Vehicle B. In some examples, media device 410 corresponds with any of computing devices 110, 140, 170, media device 230, and/or media device 330. In some examples, vehicle 400 has media device 410 mounted below where the license plate might ordinarily be placed. One of ordinary skill would appreciate that the media device could be placed in other suitable locations on the rear of the vehicle. In some examples, more than one media device may be placed on Vehicle 400, and may be placed on the front and/or the sides of vehicle 400.

In some embodiments, media device 410 may display media as described above with respect to FIG. 3. In some examples, media device 410 may pulse media projected on the media device in order to increase visibility, project one or more signs in a series, and/or the like and/or combinations thereof. In some examples, media device 410 may project the same or similar media simultaneously, or nearly simultaneously, with a short delay of less than 5 seconds, as other media devices, such as one or more of computing devices 110, 140, 170, host device 220, media device 230, host device 320, media device 330, host device 360, and/or media device 370.

In some embodiments, as illustrated in FIG. 4, media device 410 may project three "yield ahead" signs on its display. This projection may occur, for instance, in response to detecting a yield sign in a first direction, a forward direction, using one or more external sensors and/or based on stored road data, which may be received from the one or more navigation applications, and/or based on other similar methods.

Figure 5:
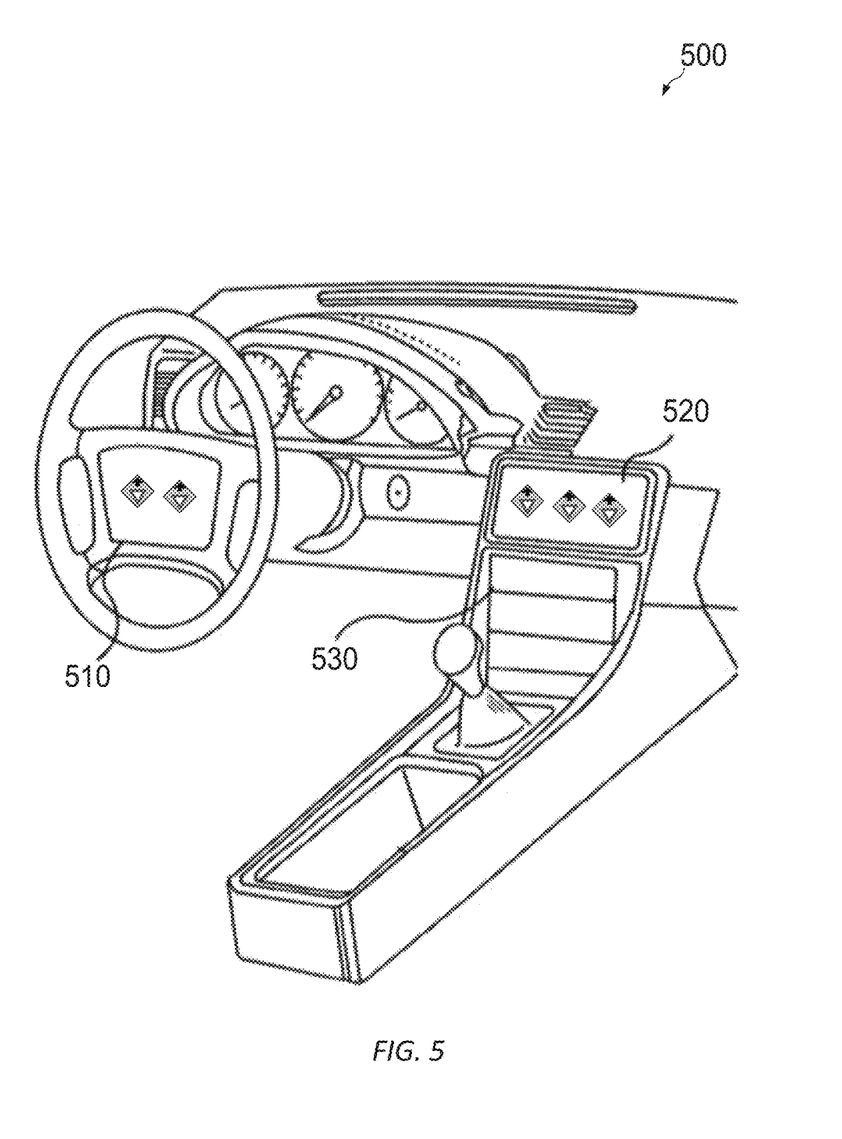
FIG. 5 is an exemplary diagram of a vehicle including one or more host devices according to some embodiments.

FIG. 5 is a simplified diagram of a vehicle 500 including host devices 510 and 520. In some embodiments, host devices 510 and 520 correspond to any of computing devices 110, 140, 170, host device 220, host device 320, and/or host device 360. In some examples, vehicle 500 corresponds with any of vehicle 200, Vehicle A, Vehicle B, and/or vehicle 400.

In some embodiments, host devices 510 and 520 may display media on their respective displays in order to replace and/or complement traditional car signals, similar to media device 410. In some examples, rings, chimes, alarms, spoken phrases, and/or the like and/or combinations thereof may be projected, such as through the car speakers. In some examples, host devices 510 and 520 may project the same or similar media simultaneously, or nearly simultaneously, with a short delay of less than 5 seconds from other devices, such as one or more of computing devices 110, 140, 170, host device 220, media device 230, host device 320, media device 330, host device 360, and/or media device 370. In some examples, host devices 510 and 520 may be controlled by a third device, host device 530, which may correspond to any of computing devices 110, 140, 170, host device 220, host device 320, and/or host device 360. The third media device 530 may be used to select media to project on the other devices.

In some embodiments, media may be projected using an augmented reality windshield (not shown) as described in U.S. patent application Ser. No. 14/774,564 ('564 Application), which is hereby incorporated by reference in its entirety, such as by using reflections to project an image from the dashboard onto the windshield. Media projected using the augmented reality windshield would not be limited to the images and outputs disclosed in the '564 application.

In some embodiments, as illustrated in FIG. 5, one or more host devices 510 and 520 may project similar "yield ahead" signs on their respective displays, with host device 510 displaying two "yield ahead" signs and host device 520 displaying three "yield ahead" signs. In some examples, the one or more host devices may also project, such as through the car speakers, an audible warning corresponding to the road sign, such as the phrase "yield ahead" and/or an audible chime. This projection may occur, for instance, in response to detecting a yield sign up ahead using one or more external sensors, based on stored road data, which may be received from the one or more navigation applications, and/or based on other similar methods.

Figure 6:
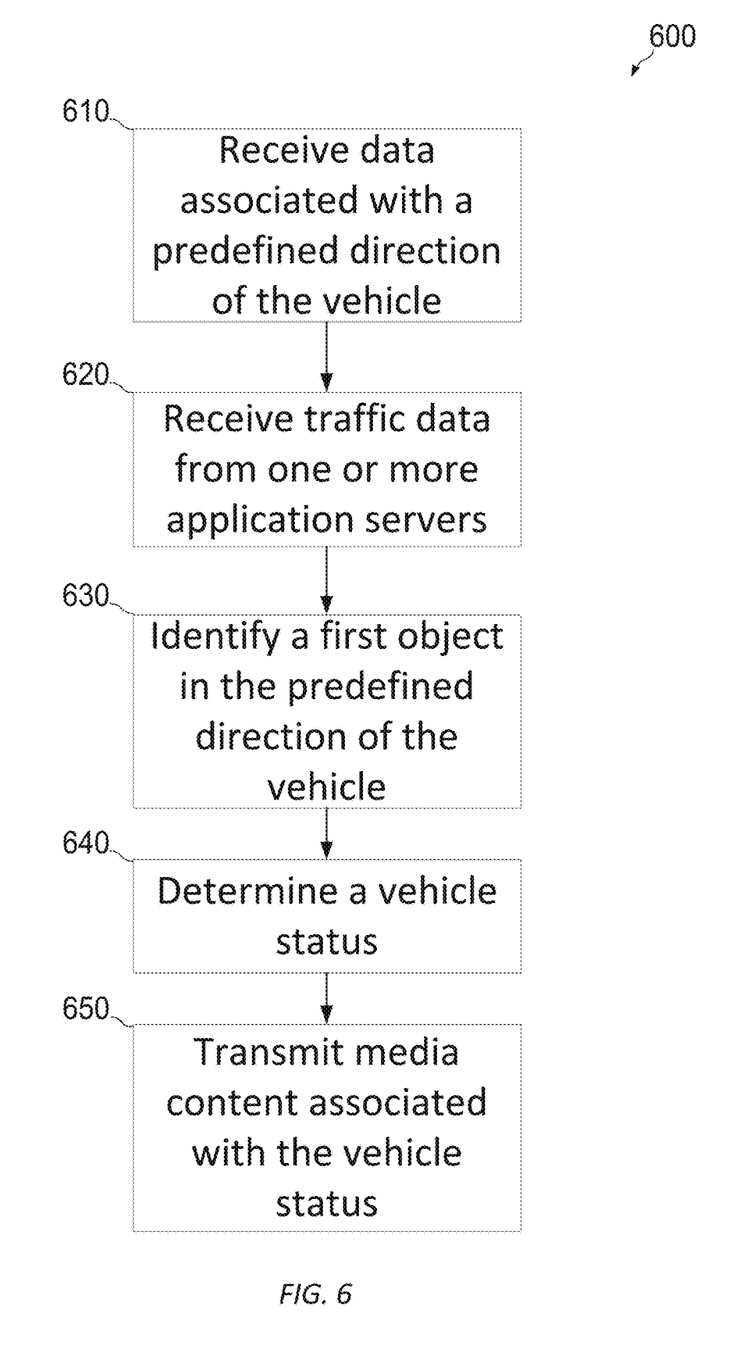
FIG. 6 is a flowchart illustrating an exemplary method for displaying media on a mountable media device according to some embodiments.

FIG. 6 is a flowchart illustrating an exemplary method 600 for displaying media on a media device, such as one or more of computing devices 110, 140, 170, host device 220, media device 230, host device 320, media device 330, host device 360, media device 370, media device 410, host device 510, and/or host device 520. Method 600 is illustrated in FIG. 6 as a set of processes 610-650. In some examples, not all of the illustrated processes may be performed in all embodiments of method 600. Additionally, one or more processes not expressly illustrated in FIG. 6 may be included before, after in between, or as part of processes 610-650. In some embodiments, one or more processes 610-650 may be implemented, at least in part, in the form of executable code stored on non-transitory, tangible, computer readable media that when run by one or more processors (e.g., a processor of the media device) may cause the one or more processors to perform one or more of processes 610-650. In some examples, the method may begin in response to a user input. In some embodiments, the media device may begin communication with a host device, such as one or more of computing devices 110, 140, 170, host device 220, host device 320, host device 360, host device 510, and/or host device 520.

During a process 610, data may be received by the media device from one or more sources, including the host device and/or other devices on a network, such as network 101. The data may be received from one or more sensors, such as those discussed above with respect to FIG. 3. The one or more sensors, may receive data associated with a predefined direction of the vehicle, such as a front of a vehicle, side of a vehicle, a rear of the vehicle, and/or any predefined direction of the vehicle.

During a process 620, traffic data may be received by the media device from one or more application servers, such as application servers discussed above with respect to FIG. 3. In some examples, traffic data may include information about roads, including current congestion and congestion trends on one or more roads, accidents, emergencies, construction, road closings, detours, truck stops, rest stops, weather conditions, other road conditions, and/or the like.

During a process 630, a first object in the predefined direction of the vehicle is identified based on the traffic data and/or based on data from one or more sensors. In some embodiments, one or more objects may be detected by one or more sensors. The media device may receive the data from the one or more sensors and identify a first object. In some examples, the first object may be a pedestrian, a street sign, a vehicle, an animal, an obstruction, traffic cones, flares and/or the like.

During a process 640, the media device may determine a vehicle status. In some embodiments, in response to the data received, the media device may determine a vehicle status as discussed above with respect to FIG. 3. In some examples, the media device receives the vehicle status from the host device or some other device that determines the vehicle status.

During a process 650, media content associated with the vehicle status is transmitted. In some embodiments, the media device projects media content, similar to projection of media content on one or more of computing devices 110, 140, 170, host device 220, media device 230, host device 320, media device 330, host device 360, media device 370, media device 410, host device 510, and/or host device 520. In some examples, the media device transmits the media content to other devices, such as any of one or more of computing devices 110, 140, 170, host device 220, media device 230, host device 320, media device 330, host device 360, media device 370, media device 410, host device 510, and/or host device 520.

Figure 7:
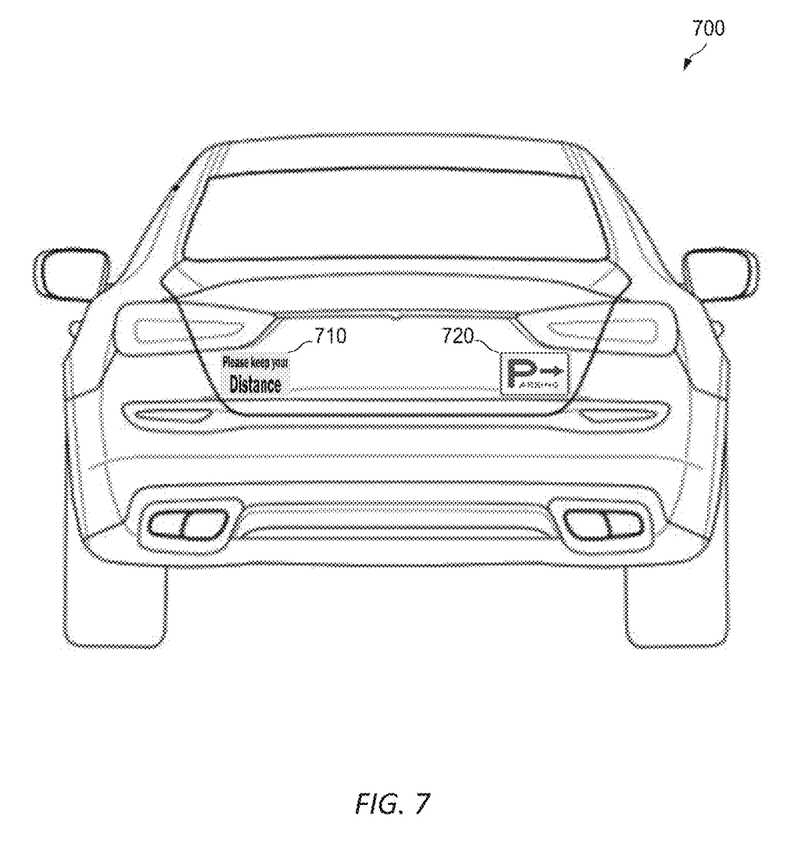
FIG. 7 is an exemplary diagram of a vehicle with two mountable media devices according to some embodiments.

FIG. 7 is an exemplary diagram of a vehicle 700, with media devices 710 and 720 mounted thereto, the media devices 710 and 720 corresponding to one or more of computing devices 110, 140, 170, media device 230, media device 330, media device 370, and/or media device 410. In some examples, media devices 710 and 720 are mounted to the exterior of vehicle 700 symmetrically, e.g., dividing the rear of the vehicle by a vertical axis in a center of the rear of vehicle 700, media devices 710 and 720 being placed equidistant from the vertical axis. One of ordinary skill would appreciate that media devices 710 and 720 could be placed in other suitable locations on the vehicle. In some examples, more than two media devices may be included on vehicle 700 and may be placed on the front and/or the sides of vehicle 700. In some examples, media device 710 may project a "Please keep your distance" sign on its display and media device 720 may project a "Parking" sign with an arrow indicating a direction of an intended parking space for the vehicle. In some examples, the "Please keep your distance" sign is yellow and the "Parking" sign is green, and the arrow is pointing to the right of vehicle 700. In some examples, vehicle 700 corresponds with any of vehicle 200, Vehicle A, Vehicle B, vehicle 400, and/or vehicle 500.

Figure 8:
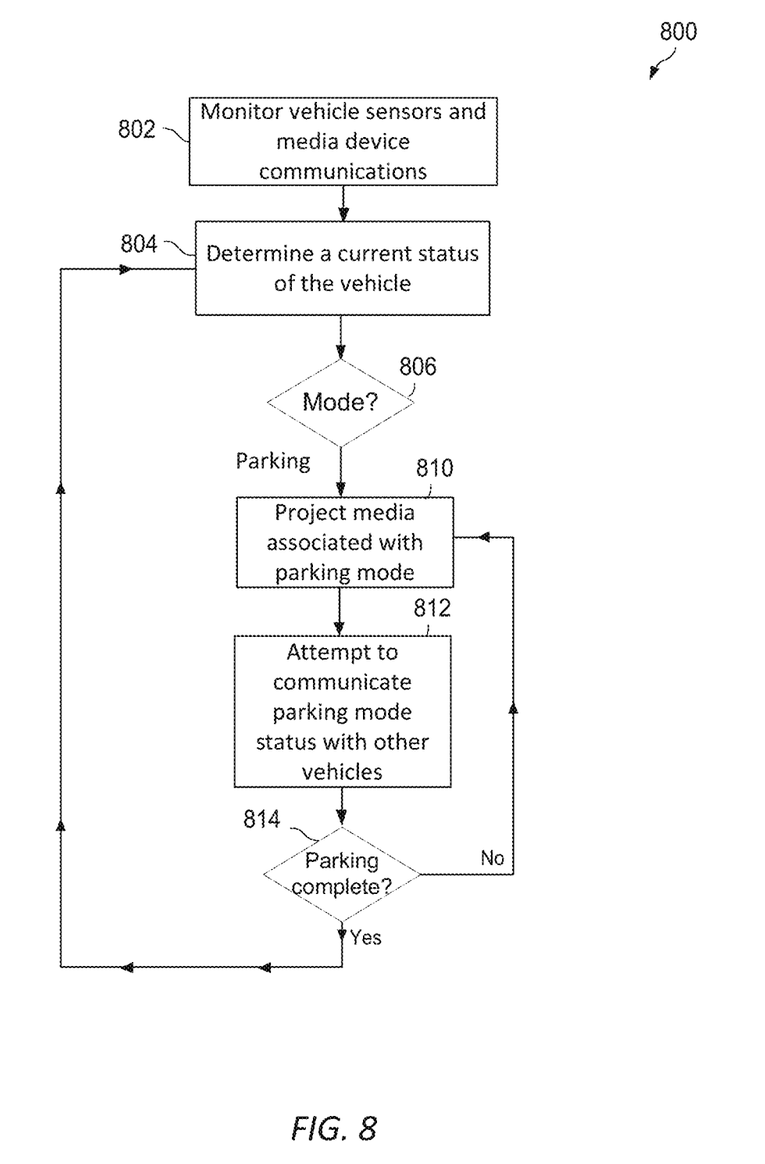
FIG. 8 is a flowchart illustrating an exemplary method for displaying media on one or more media devices according to some embodiments.

FIG. 8 is a flowchart illustrating an exemplary method 800 for displaying media on one or more media devices. In some embodiments, the method 800 may occur during a parking mode. In some examples, the one or more media devices may correspond to one or more of computing devices 110, 140, 170, host device 220, media device 230, host device 320, media device 330, host device 360, media device 370, media device 410, host device 510, host device 520, media device 710, and/or media device 720, and one or more sensors may include those sensors discussed above with respect to FIG. 3. Method 800 is illustrated in FIG. 8 as a set of processes 802-814. In some examples, not all of the illustrated processes may be performed in all embodiments of method 800. Additionally, one or more processes not expressly illustrated in FIG. 8 may be included before, after, in between, or as part of processes 802-814. In some embodiments, one or more processes 802-814 may be implemented, at least in part, in the form of executable code stored on non-transitory, tangible, computer readable media that when run by one or more processors (e.g., a processor of the media device) may cause the one or more processors to perform one or more of processes 802-814.

During a process 802, one or more media devices may monitor one or more vehicle sensors and other media device communications. The monitoring may occur continuously, periodically, and/or at set location markers. In some examples, process 802 may be performed concurrently with other steps in method 800. In some examples, the method may begin in response to a user input.

During a process 804, the one or more media devices may determine a current status of the vehicle. In some embodiments, in response to the data received during process 702, the one or more media devices may determine a vehicle status as discussed above with respect to FIG. 3. In some examples, one or more media devices receive the vehicle status from a host device or some other device that determines the vehicle status.

During a process 806, the one or more media devices may determine a current status of the vehicle corresponds to a parking mode, which may be determined as discussed above with respect to FIG. 3. In some examples, Parking mode, for instance, may be determined based on an input to enter parking mode, a speed of the vehicle, a proximity to a set destination in a navigation application, from one or more applications used for locating parking, and/or the like and/or combinations thereof.

During a process 810, the one or more media devices may project media associated with the determined mode, parking mode. In some examples, the media includes a first image comprising at least one road sign. In some examples, the first image comprises a parking road sign. Some of the advantages of disclosed embodiments over traditional driving systems includes the enhanced communication ability with outside observers hoping to anticipate the future movements of a vehicle, faster computation of navigation, and reduced traffic. In some examples, a vehicle such as vehicle 700 may pull forward in order to parallel park into an open space to the vehicle's right. A vehicle behind vehicle 700 may follow too closely, unaware of vehicle 700's intention to reverse and pull into the spot. This may cause unnecessary traffic as the vehicle behind vehicle 700 will have to either reverse or attempt to merge into another lane to its left in order to allow vehicle 700 space to reverse.

In some embodiments, the method 800, when performed in part by media devices 710 and 720, may provide a vehicle behind vehicle 700 advanced notice of vehicle 700's intended future movement. In some examples, as illustrated in FIG. 8, media device 710 may project a "Please keep your distance" sign on its display and media device 720 may project a "Parking" sign with an arrow indicating a direction of an intended parking space for the vehicle. As a result, in some examples, a vehicle behind vehicle 700 will allow more space, such as a full car length, between the two vehicles to allow vehicle 700 to pull into a parking space.

During a process 812, the one or more media devices may attempt to communicate the parking mode status with other vehicles using a system similar to the system described above with respect to FIGS. 3-5 and 7. In some examples, the one or more media devices may form a network such as network 101.

During a process 814, the one or more media devices determine when parking mode is complete for the vehicle, such as vehicle 700. In some examples, parking mode is complete once the vehicle is shifted into a parking gear of the vehicle. The one or more media devices may receive a user input indicating parking is complete, information about a distance from a curb from one or more operation sensors, information about a distance from objects in front of and/or behind the vehicle, information about the tires and contact with the curb, and/or the like and/or a combination thereof. Parking mode may include autonomous driving according to the systems and methods in the '571 Patent. In some examples, parking is complete once tires are in contact with the curb, and are turned away from or turned into the curb, such as for parallel parking on an inclined plane. In some examples, parking is complete when the distance from the curb is less than 18 inches, or less than whatever the legally required limit is.

Figure 9:
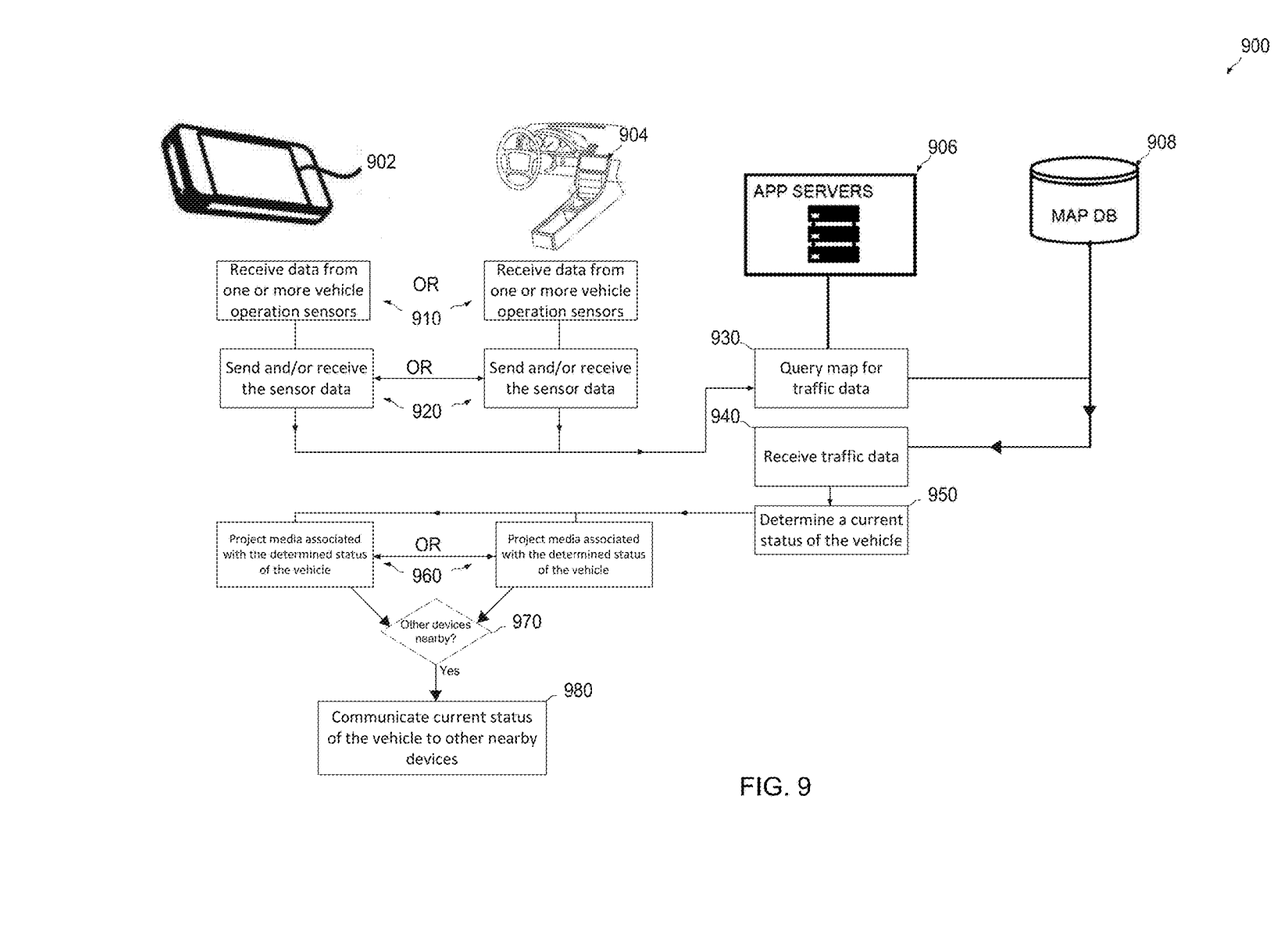
FIG. 9 is a flowchart illustrating an exemplary method and system for determining and communicating a vehicle status.

FIG. 9 is a flowchart illustrating an exemplary method 900 of determining and communicating a vehicle status, which may be carried out by one or more of media device 902, host device 904, application servers 906, and map database 908. In some examples, media device 902 may correspond to one or more of computing devices 110, 140, 170, media device 230, media device 330, host device 360, media device 370, media device 410, media device 710, and/or media device 720. In some examples, host device 904 may correspond to one or more of computing devices 110, 140, 170, host device 220, host device 320, host device 360, host device 510, and/or host device Method 900 is illustrated in FIG. 9 as a set of processes 910-980. In some examples, not all of the illustrated processes may be performed in all embodiments of method 900. Additionally, one or more processes not expressly illustrated in FIG. 9 may be included before, after in between, or as part of processes 910-980. In some embodiments, one or more processes 910-980 may be implemented, at least in part, in the form of executable code stored on non-transitory, tangible, computer readable media that when run by one or more processors (e.g., a processor of the media device) may cause the one or more processors to perform one or more of processes 910-980.

During a process 910, media device 902 and/or host device 904 may receive data from one or more vehicle operation sensors, such as sensors discussed above with respect to FIG. 3.

During a process 920, media device 902 and/or host device 904 may send and/or receive the sensor data to each other. In some examples, sensor data is sent in response to the sensors detecting a first traffic object in a first predefined direction of the vehicle. In some examples, data collected from the one or more vehicle operation sensors may be sent from media device 902 and/or host device 904 to application servers.

During a process 930, the application servers may query a map or GIS database for traffic data, such as traffic data described above with respect FIG. 3. Application servers can interact with the map or GIS database through a map API such as the GOOGLE MAPS API. In some examples, the applications query the map or GIS database for traffic data in response to receiving the sensor data from the media device and/or host device 904.

During a process 940, the application servers receive the traffic data and may store it in one or more databases. In some examples, the traffic data may be forwarded to the media device 902 and/or host device 904.

During a process 950, in some embodiments, the applications servers may determine a status of the vehicle, as discussed above with respect to FIG. 3, including based on the vehicle operation sensor data and the traffic data. In some examples, the status of the vehicle may be determined by media device 902 and/or host device 904.

During a process 960, media device 902 and/or host device 904 may project media as discussed above with respect to FIGS. 3-5 and FIG. 7.

During a process 970, media device 902 and/or host device 904 may attempt to communicate with other devices as described above with respect to FIGS. 3-5 and 7.

During a process 980, media device 902 and/or host device 904 may communicate the current status of the vehicle to other nearby devices.

As discussed above and further emphasized here, FIGS. 1-9 are merely exemplary, and should not unduly limit the scope of the claims. Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An apparatus, comprising:
a host device inside a vehicle coupled to a media device, the media device adaptable to being mounted to the vehicle and including a display within a housing;
the host device being configured to:
receive data associated with a predefined direction of the vehicle from one or more vehicle operation sensors coupled to the vehicle;
receive traffic data from one or more application servers over a network;
identify a first traffic object in the predefined direction of the vehicle;
determine the vehicle status based on the data about the predefined direction of the vehicle and the traffic data; and
transmit media content to be presented on the display to a second traffic object different from the vehicle associated with the determined vehicle status, the media content including a first image comprising at least one road sign.

2. The apparatus of claim 1, wherein the host device is coupled to the media device via a wireless link.

3. The apparatus of claim 1, wherein the host device includes a second display, and the host device is further configured to present second media on the second display corresponding to the determined vehicle status, including a second image comprising the at least one road sign.

4. The apparatus of claim 3, wherein the host device is further configured to project an audible warning corresponding to the at least one road sign through speakers of the vehicle.

5. The apparatus of claim 4, wherein the vehicle status corresponds to a parking mode, and the first image comprises at least one parking road sign.

6. The apparatus of claim 1, wherein the media device is mounted on a rear portion of the vehicle.

7. The apparatus of claim 1, wherein the host device is further configured to establish a communication link with a second host device inside a second vehicle.

8. The apparatus of claim 1, wherein the host device is further configured to transmit instructions to project the media content on a second host device.

9. The apparatus of claim 1, wherein the host device is further configured to transmit instructions to project the media content on a second media device mounted on a second vehicle.

10. A method comprising:
receiving, by a host device inside a vehicle coupled to a media device, data associated with a predefined direction of the vehicle from one or more vehicle operation sensors coupled to the vehicle;
receiving traffic data from one or more application servers over a network;
identifying a first traffic object in the predefined direction of the vehicle;
determining the vehicle status based on the data about the predefined direction of the vehicle and the traffic data; and
transmitting media content to be presented on the display to a second traffic object different from the vehicle associated with the determined vehicle status, the media content including a first image comprising at least one road sign.

11. The method of claim 10, further comprising projecting an audible warning corresponding to the at least one road sign through speakers of the vehicle.

12. The method of claim 10, wherein the media device is mounted to the outside of the vehicle.

13. The method of claim 12, wherein the mounted media device is mounted to a rear outer portion of the vehicle by one or more fasteners.

14. The method of claim 10, further comprising transmitting instructions to project the media content on a second host device.

15. The method of 11, further comprising projecting the media on an augmented reality windshield within the vehicle.

16. A system, comprising:
a host device inside a vehicle;
a media device mounted to the vehicle and including a display within a housing, the media device being configured to:
receive data associated with a predefined direction of the vehicle from one or more vehicle operation sensors coupled to the vehicle;
receive traffic data from one or more application servers over a network;
identify a first traffic object in the predefined direction of the vehicle;
determine the vehicle status based on the data about the predefined direction of the vehicle and the traffic data; and
transmit media content to be presented on the display to a second traffic object different from the vehicle associated with the determined vehicle status, the media content including a first image comprising at least one road sign.

17. The system of claim 16, wherein the host device includes a second display and is configured to display the media on the second display.

18. The system of claim 16, wherein the display is configured to display a default image different from the first image.

19. The display system of claim 16, wherein the media device has a flexible, 3-D shape.

* * * * *